US011675442B2

(12) United States Patent
Zhang

(10) Patent No.: US 11,675,442 B2
(45) Date of Patent: Jun. 13, 2023

(54) IMAGE PROCESSING METHOD AND FLEXIBLE-SCREEN TERMINAL

(71) Applicant: VIVO MOBILE COMMUNICATION CO., LTD., Guangdong (CN)

(72) Inventor: Yaokun Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 165 days.

(21) Appl. No.: 16/980,810

(22) PCT Filed: Mar. 15, 2019

(86) PCT No.: PCT/CN2019/078242
§ 371 (c)(1),
(2) Date: Sep. 14, 2020

(87) PCT Pub. No.: WO2019/174629
PCT Pub. Date: Sep. 19, 2019

(65) Prior Publication Data
US 2021/0200329 A1 Jul. 1, 2021

(30) Foreign Application Priority Data
Mar. 15, 2018 (CN) .......................... 201810214256.0

(51) Int. Cl.
*G06F 3/033* (2013.01)
*G06F 3/0482* (2013.01)
(Continued)

(52) U.S. Cl.
CPC ............ *G06F 3/033* (2013.01); *G06F 1/1652* (2013.01); *G06F 3/0482* (2013.01);
(Continued)

(58) Field of Classification Search
CPC ...... G06F 3/033; G06F 1/1652; G06F 3/0482; G06F 3/04845; G06F 1/1694;
(Continued)

(56) References Cited

U.S. PATENT DOCUMENTS 10,152,201 B2 * 12/2018 Kang ................... H04M 1/0245
2010/0120470 A1 * 5/2010 Kim ..................... G06F 3/04883
715/830
(Continued)

FOREIGN PATENT DOCUMENTS

CN 103197879 A 7/2013
CN 103257838 A 8/2013
(Continued)

OTHER PUBLICATIONS

KR Office Action dated May 3, 2022 as received in Application No. 10-2020-7029370.
(Continued)

*Primary Examiner* — Andrew Sasinowski
(74) *Attorney, Agent, or Firm* — Maschoff Brennan

(57) ABSTRACT

An image processing method and a flexible-screen terminal are provided. The method includes: receiving a first input by a flexible-screen terminal user, the first input being used for bending the flexible-screen terminal; in response to the first input, displaying a number N of images in a first display area of the flexible-screen terminal and displaying an operational control zone in a second display area of the flexible-screen terminal; receiving a second input by the user, the second input being used for selecting a number M of target images from the number N of images; in response to the second input, displaying the number M of target images selected by the second input in the operational control zone; displaying text information of the number M of target images in the first display area.

20 Claims, 13 Drawing Sheets

(51) Int. Cl.
  *G06F 3/0484* (2022.01)
  *G06F 1/16* (2006.01)
  *G06F 3/04845* (2022.01)
  *H04M 1/02* (2006.01)
  *G06F 1/3234* (2019.01)

(52) U.S. Cl.
  CPC ...... *G06F 3/04845* (2013.01); *H04M 1/0268* (2013.01); *G06F 1/1694* (2013.01); *G06F 1/3265* (2013.01)

(58) Field of Classification Search
  CPC ......... G06F 1/3265; G06F 2203/04803; G06F 1/1677; G06F 1/3218; G06F 3/0481; G06F 3/0487; G06F 3/04883; G06F 3/04886; G06F 3/01; G06F 3/0484; Y02D 10/00; H04M 1/0214; H04M 1/0268; H04M 1/72454; G06V 30/40
  See application file for complete search history.

(56) References Cited

U.S. PATENT DOCUMENTS

| | | |
|---|---|---|
| 2010/0177036 A1 | 7/2010 | Nam |
| 2013/0021273 A1 | 1/2013 | Lee et al. |
| 2013/0135182 A1 | 5/2013 | Jung et al. |
| 2013/0147793 A1 | 6/2013 | Jeon et al. |
| 2013/0176248 A1* | 7/2013 | Shin ............... G06F 1/1652 345/173 |
| 2014/0062976 A1 | 3/2014 | Park et al. |
| 2014/0247229 A1* | 9/2014 | Cho ............... G06F 1/1652 345/173 |
| 2015/0254471 A1 | 9/2015 | You et al. |
| 2015/0286288 A1* | 10/2015 | Lee ............... G06F 3/03 345/173 |
| 2017/0045993 A1* | 2/2017 | Oh ............... G06F 3/017 |
| 2017/0053592 A1 | 2/2017 | Shin et al. |
| 2017/0131872 A1 | 5/2017 | Husain |
| 2018/0242446 A1* | 8/2018 | Cho ............... H04M 1/0247 |
| 2019/0391680 A1* | 12/2019 | Jung ............... G06F 3/0488 |
| 2021/0271378 A1 | 9/2021 | Kim |

FOREIGN PATENT DOCUMENTS

| | | |
|---|---|---|
| CN | 105808140 A | 7/2016 |
| CN | 107508936 A | 12/2017 |
| CN | 107566641 A | 1/2018 |
| CN | 107643847 A | 1/2018 |
| CN | 107644170 A | 1/2018 |
| CN | 108469898 A | 8/2018 |
| JP | 2000152145 A | 5/2000 |
| JP | 2017040908 A | 2/2017 |
| KR | 10-2013-0010684 A | 1/2013 |
| KR | 10-2013-0080937 A | 7/2013 |
| KR | 10-2014-0031679 A | 3/2014 |
| KR | 10-2017-0100951 A | 9/2017 |

OTHER PUBLICATIONS

IN Office Action dated Aug. 27, 2021 as received in Application No. 202027044536.
JP Office Action dated Nov. 30, 2021 as received in Application No. 2020-549564.
CN Office Action in Application No. 201810214256.0 dated Oct. 21, 2019.
CN Office Action in Application No. 201810214256.0 dated Feb. 3, 2020.
Written Opinion and International Search Report in Application No. PCT/CN2019/078242 dated Sep. 24, 2020.

* cited by examiner

200

| < | album | | edit |
|---|---|---|---|
| ☺ | ☺ | ☺ | ☺ |
| the OSI 7-layer model includes | a physical layer, | a data link layer, | a network layer, |
| a transport layer, | a session layer, | a presentation layer, | an application layer |
| ☺ | ☺ | ☺ | ☺ |
| ☺ | ☺ | ☺ | ☺ |
| ☺ | ☺ | ☺ | ☺ |
| camera photos | | all albums | intelligent classification |

Fig.2

IMAGE PROCESSING METHOD AND FLEXIBLE-SCREEN TERMINAL

CROSS-REFERENCE TO RELATED APPLICATION

The present application is the U.S. national phase of PCT Application No. PCT/CN2019/078242 filed on Mar. 15, 2019, which claims a priority of the Chinese patent application 201810214256.0 filed on Mar. 15, 2018, which are incorporated herein by reference in their entirety.

TECHNICAL FIELD

Embodiments of the present disclosure relate to the field of communication technology, in particular to an image processing method and a flexible-screen terminal.

BACKGROUND

With rapid development of flexible-screen terminals, flexible-screen terminals are provided with a variety of functions, among which the most frequently used by people in daily life is photograph function. In various scenarios, a user may record the scene at that time by taking photos. For example, when attending a class or a lecture, a user may record corresponding information by taking photos of power point (PowerPoint, PPT) presentations or blackboard-writings using a flexible-screen terminal, and processes the images in spare time.

In related art, when a user needs to process multiple images related to text information in batches, e.g., when it is necessary to convert uniformly all images of PPT that were photographed during a lecture to text information, text information in each image has to be identified individually and then a series of complicated operations are required to finally convert the contents of the images to text information for storage. So, the process of converting image contents to text information in the related art has the problem of complicated operation steps.

SUMMARY

The present disclosure provides, in some embodiments, an image processing method and a flexible-screen terminal, to solve the problem in the related art that the process of converting image contents to text information has the problem of complicated operation steps.

To solve the foregoing problem, the present disclosure provides following implementations:

In a first aspect, the present disclosure provides, in some embodiments, an image processing method, including:

receiving a first input by a flexible-screen terminal user, the first input being used for bending the flexible-screen terminal;

displaying a number N of images in a first display area of the flexible-screen terminal and displaying an operational control zone in a second display area of the flexible-screen terminal in response to the first input;

receiving a second input by a user, the second input being used for selecting a number M of target images from the number N of images;

displaying the number M of target images selected by the second input in the operational control zone in response to the second input; and displaying text information of the number M of target images in the first display area, wherein the first display area and the second display area are areas generated by dividing a display area of the flexible-screen terminal using a first bend line formed by the first input, both M and N are positive integers and M is less than or equal to N.

In a second aspect, the present disclosure further provides, in some embodiments, a flexible-screen terminal, including:

a first reception module, configured to receive a first input by a flexible-screen terminal user, the first input being used for bending the flexible-screen terminal;

a first display module, configured to display a number N of images in a first display area of the flexible-screen terminal and display an operational control zone in a second display area of the flexible-screen terminal in response to the first input;

a second reception module, configured to receive a second input by the user, the second input being used for selecting a number M of target images from the number N of images;

a second display module, configured to display the number M of target images selected by the second input in the operational control zone in response to the second input; and a third display module, configured to display text information of the number M of target images in the first display area, wherein the first display area and the second display area are areas generated by dividing a display area of the flexible-screen terminal using a first bend line formed by the first input, both M and N are positive integers and M is less than or equal to N.

In a third aspect, the present disclosure further provides, in some embodiments, a flexible-screen terminal, including: a processor, a memory and a computer program stored in the memory and capable of running on the processor. The computer program is executed by the processor to implement steps of the foregoing image processing method.

In a fourth aspect, the present disclosure further provides, in some embodiments, a computer readable storage medium storing a computer program. The computer program is executed by a processor to implement steps of the foregoing image processing method.

In embodiments of the present disclosure, a first input is received from a flexible-screen terminal user, the first input being used for bending the flexible-screen terminal; in response to the first input, a number N of images are displayed in a first display area of the flexible-screen terminal and an operational control zone is displayed in a second display area of the flexible-screen terminal; a second input is received from the user, the second input being used for selecting a number M of target images from the number N of images; in response to the second input, the number M of target images selected by the second input are displayed in the operational control zone; and text information of the number M of target images is displayed in the first display area. Thus, contents of selected images may be converted to text information by performing simple operations on the flexible-screen terminal, and operational steps of converting the image contents to text information are simplified, thereby significantly reducing the time spent by users on processing images.

BRIEF DESCRIPTION OF THE DRAWINGS

FIG. 2 is a first schematic diagram of a screen of a flexible-screen terminal according to some embodiments of the present disclosure;

DETAILED DESCRIPTION

Hereinafter, the technical solutions in embodiments of the present disclosure are described clearly and completely in conjunction with drawings in the embodiments of the present disclosure. Apparently, the described embodiments are merely a part of embodiments of the present disclosure, rather than all the embodiments of the present disclosure. All other embodiments obtained by a person ordinary skilled in the art based on the embodiments of the present disclosure without any creative efforts fall within the scope of the present disclosure.

Figure 1:
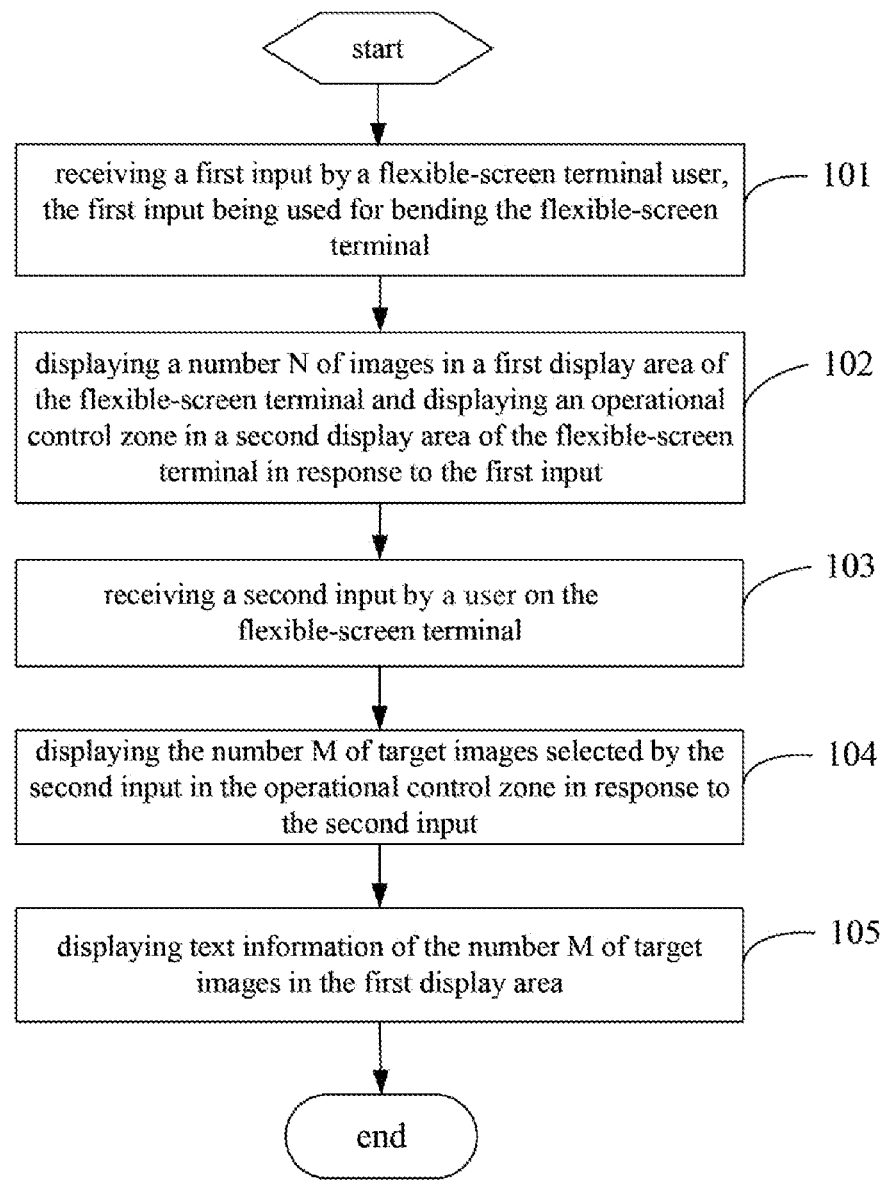
FIG. 1 is a first flow diagram of an image processing method according to some embodiments of the present disclosure.

Referring to FIG. 1, a flow diagram of an image processing method according to some embodiments of the present disclosure is illustrated. The image processing method is applied to a flexible-screen terminal, and as shown in FIG. 1, includes the following steps.

A step 101: receiving a first input by a flexible-screen terminal user.

In some embodiments of the present disclosure, the first input is used for bending the flexible-screen terminal. Specifically, the first input may be a bending operation.

Before the step 101, a user of the flexible-screen terminal may unlock the flexible-screen terminal and enable an album browsing function, so that an interface for browsing images is displayed on a flexible screen of the flexible-screen terminal. The user may adjust images displayed on the interface by performing a slide operation.

Referring to FIG. 2, a first schematic diagram of a screen of a flexible-screen terminal according to some embodiments of the present disclosure is illustrated. As shown in FIG. 2, a preview image interface is displayed on the screen of the flexible-screen terminal 200. By performing touch operations on the preview image interface, a user may adjust locations of preview images on the preview image interface. The preview images displayed on the preview image interface may include images photographed by a camera, such as images of scenery, images of people, and images including text contents.

A step 102: displaying a number N of images in a first display area of the flexible-screen terminal and displaying an operational control zone in a second display area of the flexible-screen terminal in response to the first input.

Figure 3:
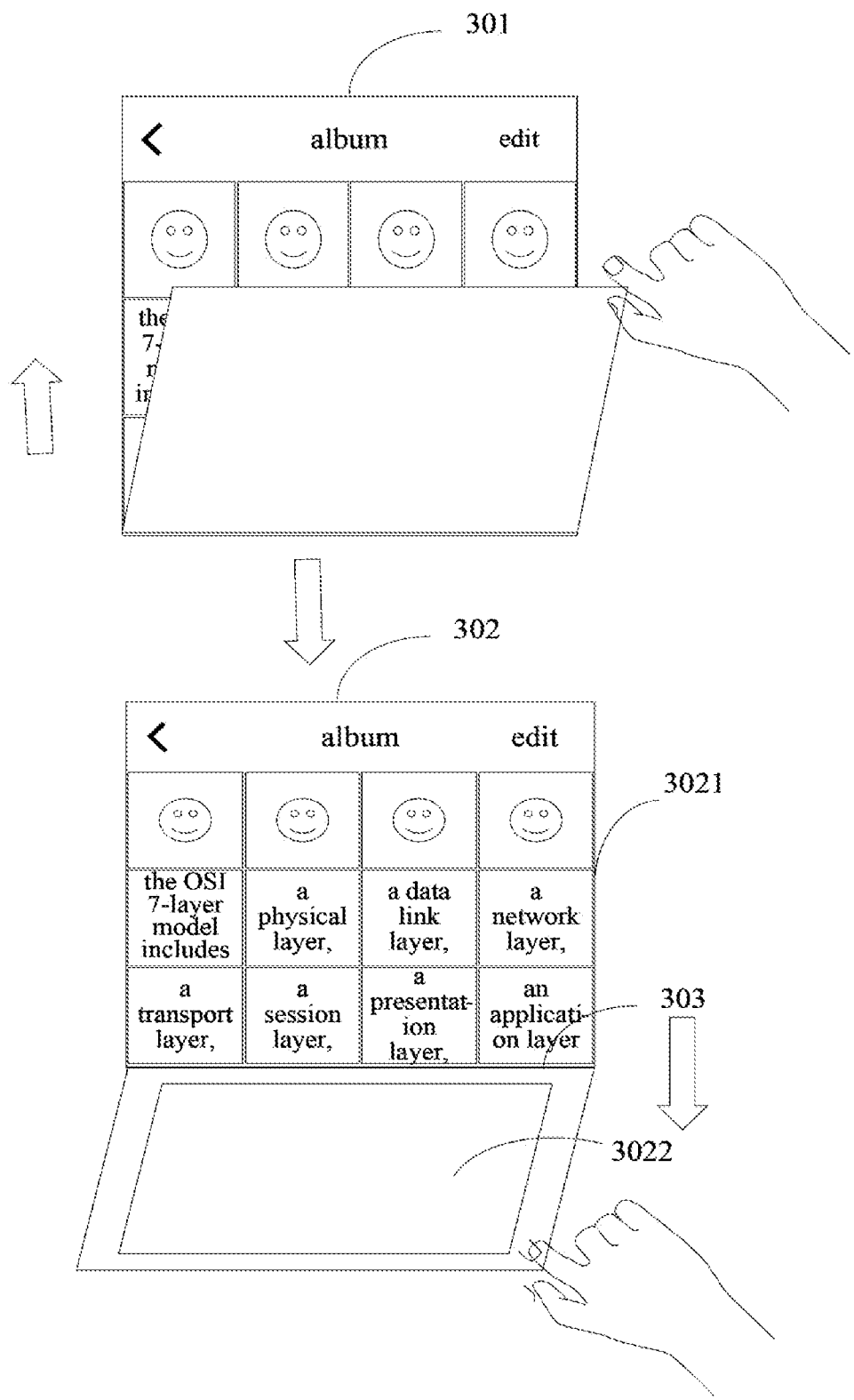
FIG. 3 is a first schematic diagram showing a screen state transition of a flexible-screen terminal according to some embodiments of the present disclosure.

In some embodiments of the present disclosure, the first display area and the second display area are two areas generated by dividing a display area of the flexible-screen terminal using a first bend line formed by the first input. For a process of bending the flexible-screen terminal by means of the first input, a reference may be made to FIG. 3, in which a first schematic diagram showing a screen state transition of a flexible-screen terminal according to some embodiments of the present disclosure is illustrated. FIG. 3 illustrates a first screen state 301 and a second screen state 302. In specific, the first screen state 301 is a screen state when the flexible-screen terminal is being bent by the first input; the second screen state 302 is a state in which the flexible screen is divided into two screen display areas after the flexible-screen terminal is bent by the first input. Specifically, in the second screen state 302, the display area of the flexible-screen terminal is divided into a first display area 3021 and a second display area 3022. The first display area 3021 displays one or more preview images and the second display area 3022 may display an operational control zone.

A step 103: receiving a second input by the user.

In some embodiments of the present disclosure, the second input is used for selecting a number M of target images from the number N of images, wherein both M and N are positive integers, and M is less than or equal to N. The second input may include a single tap operation, a double tap operation and a slide operation.

Continuing referring to FIG. 3, when the flexible screen of the flexible-screen terminal is in the second screen state 302 as shown in FIG. 3, a user may tap, with fingertip, on a number M of images displayed in the first display area 3021, to designate the number M of images in the first display area 3021 selected by the tap operations as a number M of target images; or the user may lay a finger horizontally on the number M of images displayed in the first display area 3021, to designate the number M of images touched by the finger as the number M of target images.

A step 104: displaying the number M of target images selected by the second input in the operational control zone in response to the second input.

Figure 4:
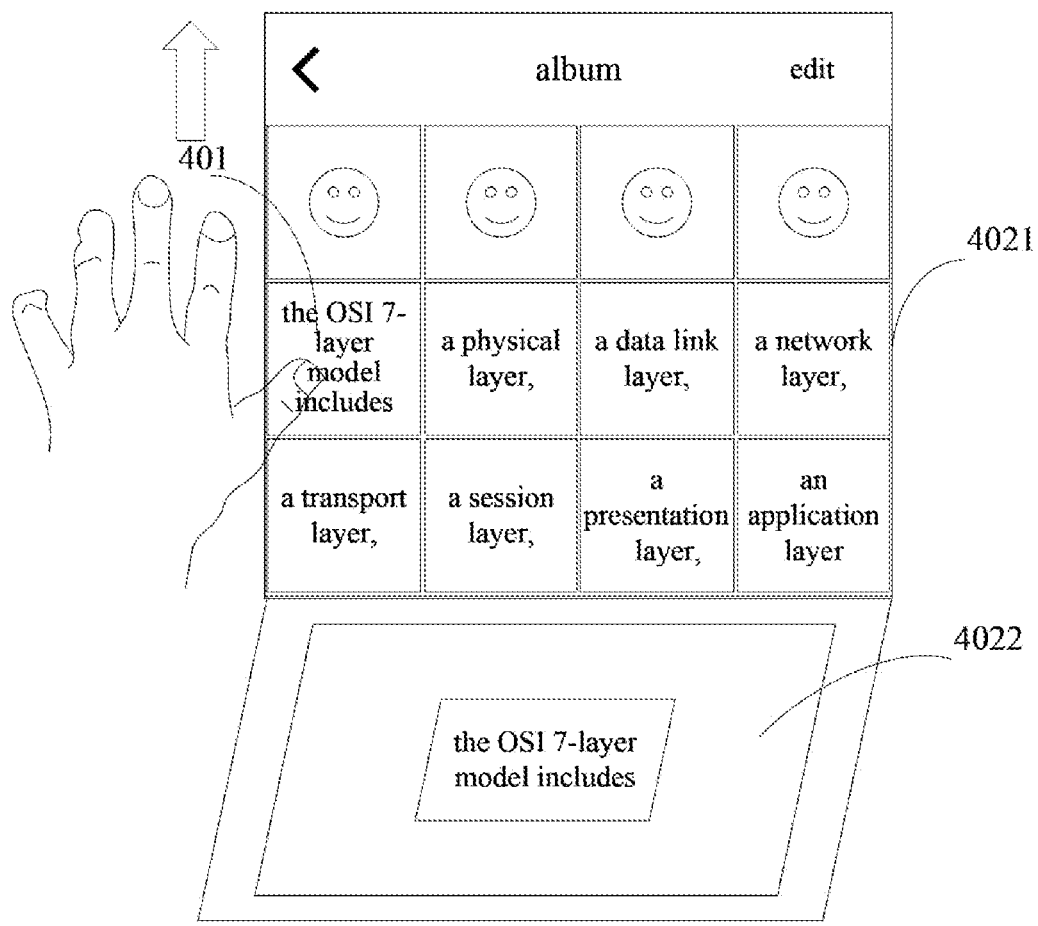
FIG. 4 is a second schematic diagram of a screen of a flexible-screen terminal according to some embodiments of the present disclosure.

In some embodiments of the present disclosure, the number M of target images may be one target image or at least two target images. Referring to FIG. 4, a second schematic diagram of a screen of a flexible-screen terminal according to some embodiments of the present disclosure is illustrated. As shown in FIG. 4, the screen of the flexible-screen terminal includes a first display area 4021 and a second display area 4022. After the second input is received, a target image 401 is displayed in the second display area 4022 in response to the second input. The text content of the target image 401 is the OSI 7-layer model includes.

A step 105: displaying text information of the number M of target images in the first display area.

In some embodiments of the present disclosure, the step 105 may include the following step: in the case that a preset trigger operation is received, identifying text information of the number M of target images and displaying the identified text information in the first display area.

Figure 5:
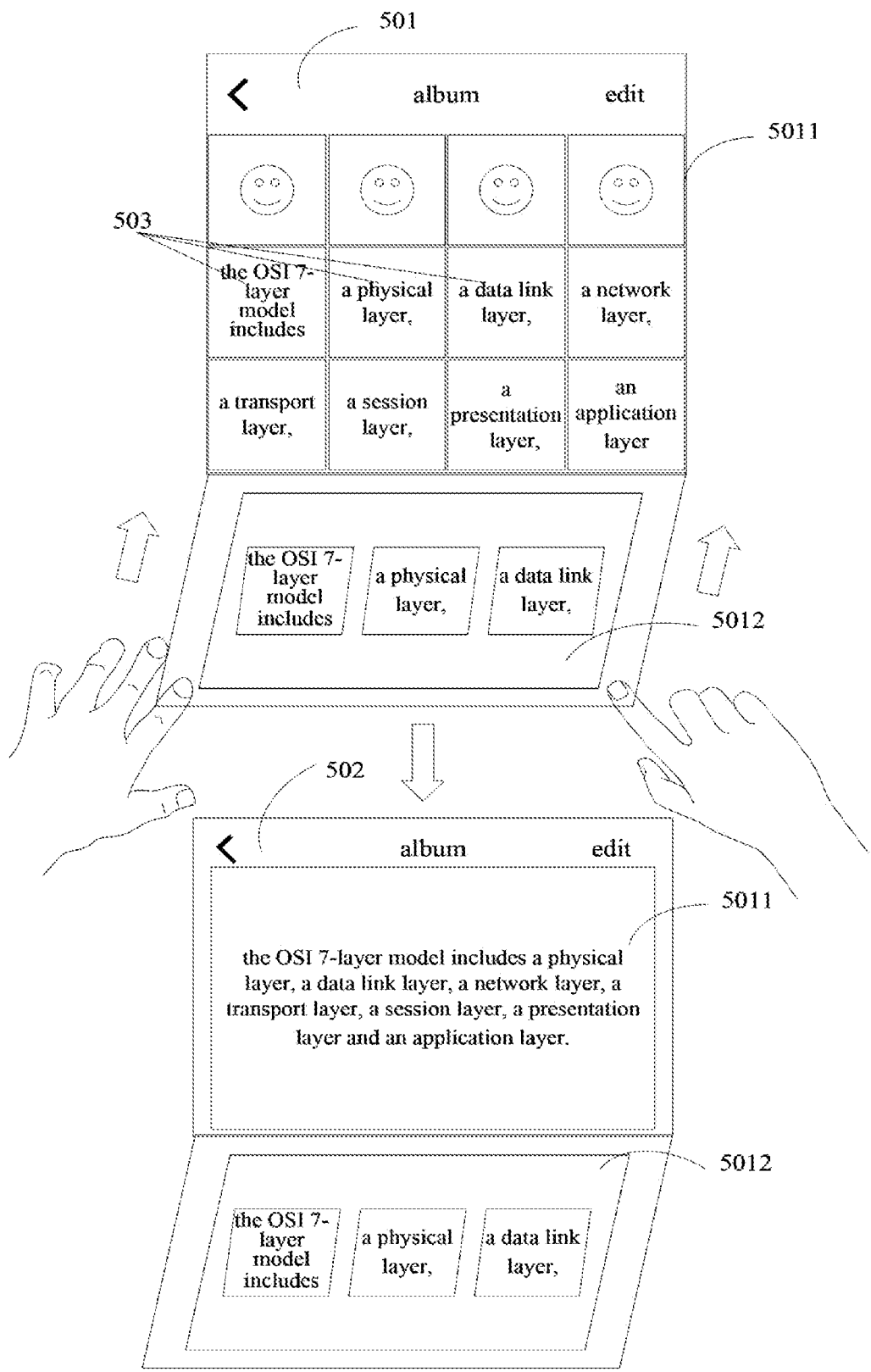
FIG. 5 is a second schematic diagram showing a screen state transition of a flexible-screen terminal according to some embodiments of the present disclosure.

Referring to FIG. 5, a second schematic diagram showing a screen state transition of a flexible-screen terminal according to some embodiments of the present disclosure is illustrated. As shown in FIG. 5, the screen of the flexible-screen terminal may include a third screen state 501 and a fourth screen state 502. When the screen is in the status of the third screen state 501, it means that three target images 503 are selected from preview images displayed in the first display area 5011 and the three target images 503 are displayed in the second display area 5012. When the screen is in the third screen state 501, in the case that a preset trigger operation is received, the screen enters the fourth screen state 502, that is, the text information of the three target images 503 displayed in the second display area 5012 is identified and the identified text information is displayed in the first display area 5011. In some embodiments of the present disclosure, after the text information is displayed in the first display area 5011, the text information in the first display area 5011 may be edited and modified. Specifically, the text information displayed in the first display area 5011 is the OSI 7-layer model includes a physical layer, a data link layer, a network layer, a transport layer, a session layer, a presentation layer and an application layer.

In some embodiments of the present disclosure, the flexible-screen terminal may be any flexible-screen terminal including a dual-camera, such as a mobile phone, a tablet personal computer, a laptop computer, a personal digital assistant (Personal Digital Assistant, PDA), a mobile internet device (Mobile Internet Device, MID) or a wearable device.

In the image processing method according to some embodiments of the present disclosure, a first input is received from a flexible-screen terminal user, the first input being used for bending the flexible-screen terminal; in response to the first input, a number N of images are displayed in a first display area of the flexible-screen terminal and an operational control zone is displayed in a second display area of the flexible-screen terminal; a second input is received from the user, the second input being used for selecting a number M of target images from the number N of images; in response to the second input, the number M of target images selected by the second input are displayed in the operational control zone; and text information of the number M of target images is displayed in the first display area. Thus, contents of selected images may be converted to text information by performing simple operations on the flexible-screen terminal, and operating steps of converting the image contents to text information are simplified, thereby significantly reducing the time spent by users on processing images.

Figure 6:
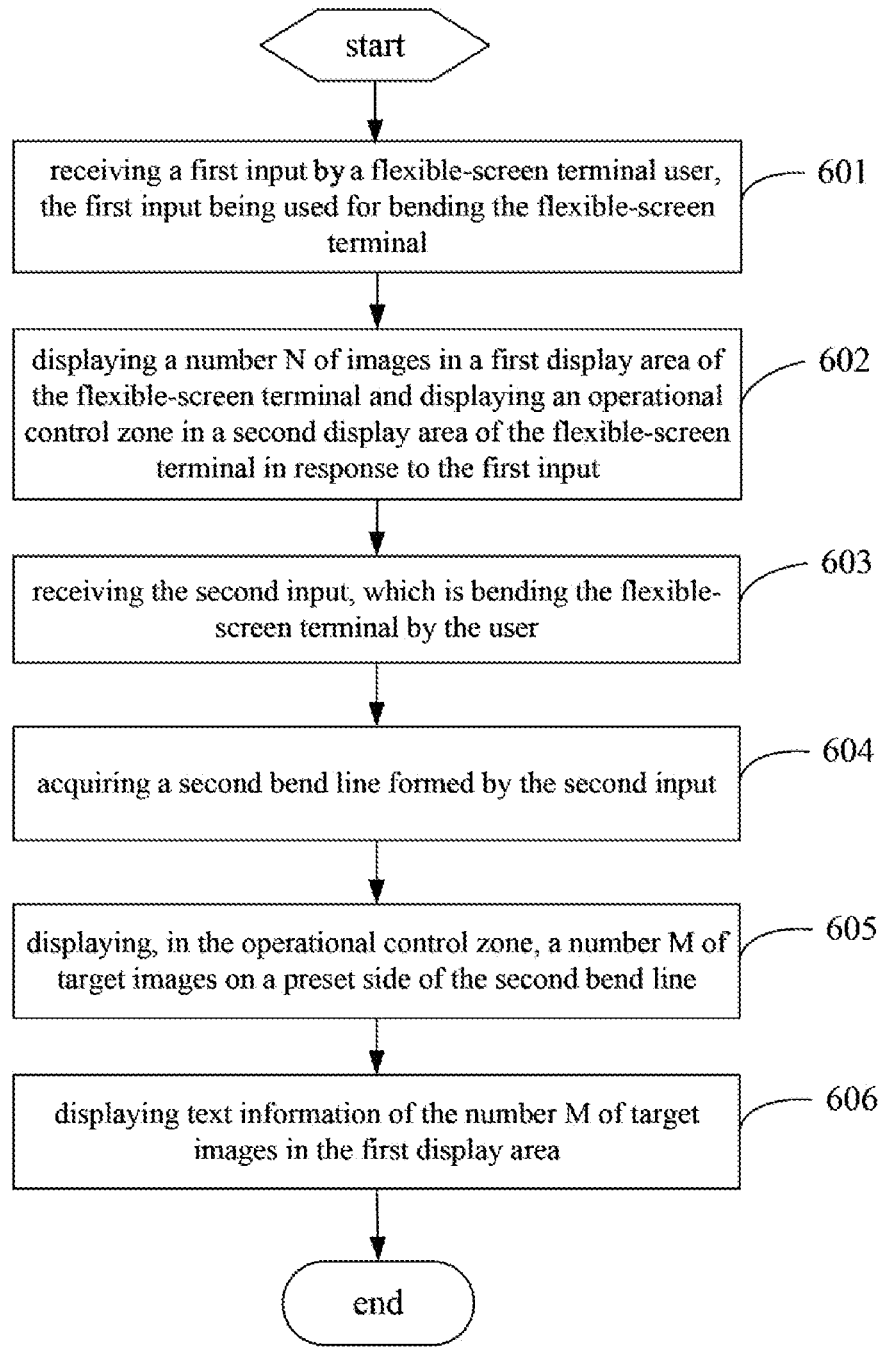
FIG. 6 is a second flow diagram of an image processing method according to some embodiments of the present disclosure.

Referring to FIG. 6, a flow diagram of an image processing method according to some embodiments of the present disclosure is illustrated. The image processing method is applied to a flexible-screen terminal, and as shown in FIG. 6, includes the following steps.

A step 601: receiving a first input by a flexible-screen terminal user.

For the implementation process and beneficial effect of the step, references may be made to the description related to the step 101, no detailed description will be made here to avoid repetition.

A step 602: displaying a number N of images in a first display area of the flexible-screen terminal and displaying an operational control zone in a second display area of the flexible-screen terminal in response to the first input.

For the implementation process and beneficial effect of the step, references may be made to the description related to the step 102, no detailed description will be made here to avoid repetition.

A step 603: receiving a second input, which is bending the flexible-screen terminal by the user.

For example, the second input, which is bending the first display area of the flexible-screen terminal by the user, is received. The first display area may be divided into two parts by a bending line generated by the second input.

A step 604: acquiring a second bend line formed by the second input.

In some embodiments of the present disclosure, a straight line defined by at least two deformation points of deformation caused by the second input may be determined as the second bend line.

A step 605: displaying, in the operational control zone, a number M of target images on a preset side of the second bend line.

In some embodiments of the present disclosure, the preset side may be set to an upper or lower side of the second bend line. For example, the number M of target images may be images on the upper side of the second bend line, or images on the lower side of the second bend line.

Thus, by means of the second bend line generated by bending the flexible-screen terminal, the number M of target images may be selected to be displayed in the operational control zone, thereby simplifying the steps of selecting the number M of target images and improving efficiency of selecting target objects.

A step 606: displaying text information of the number M of target images in the first display area.

For the implementation process and beneficial effect of the step, references may be made to the description related to the step 105, no detailed description will be made here to avoid repetition.

Optionally, in the embodiment as shown in FIG. 1, the second display area includes a number N of blank subareas, and the blank subareas correspond, in a one-to-one manner, to the number N of images displayed in the first display area in terms of location and size.

The step 103 as shown in FIG. 1 may further include the following step: receiving a number M of touch operations performed by the user in a number M of target subareas in the second display area; the step 104 as shown in FIG. 1 may further include the following step: displaying a number M of target images among the number N of images displayed in the first display area that correspond to positions of the number M of target subareas respectively in the operational control zone.

Thus, the number M of target images may be selected by performing a number M of touch operations on the blank subareas, and then displayed in the operational control zone, thereby simplifying the steps of displaying the number M of target images and improving efficiency of displaying target objects.

Figure 7:
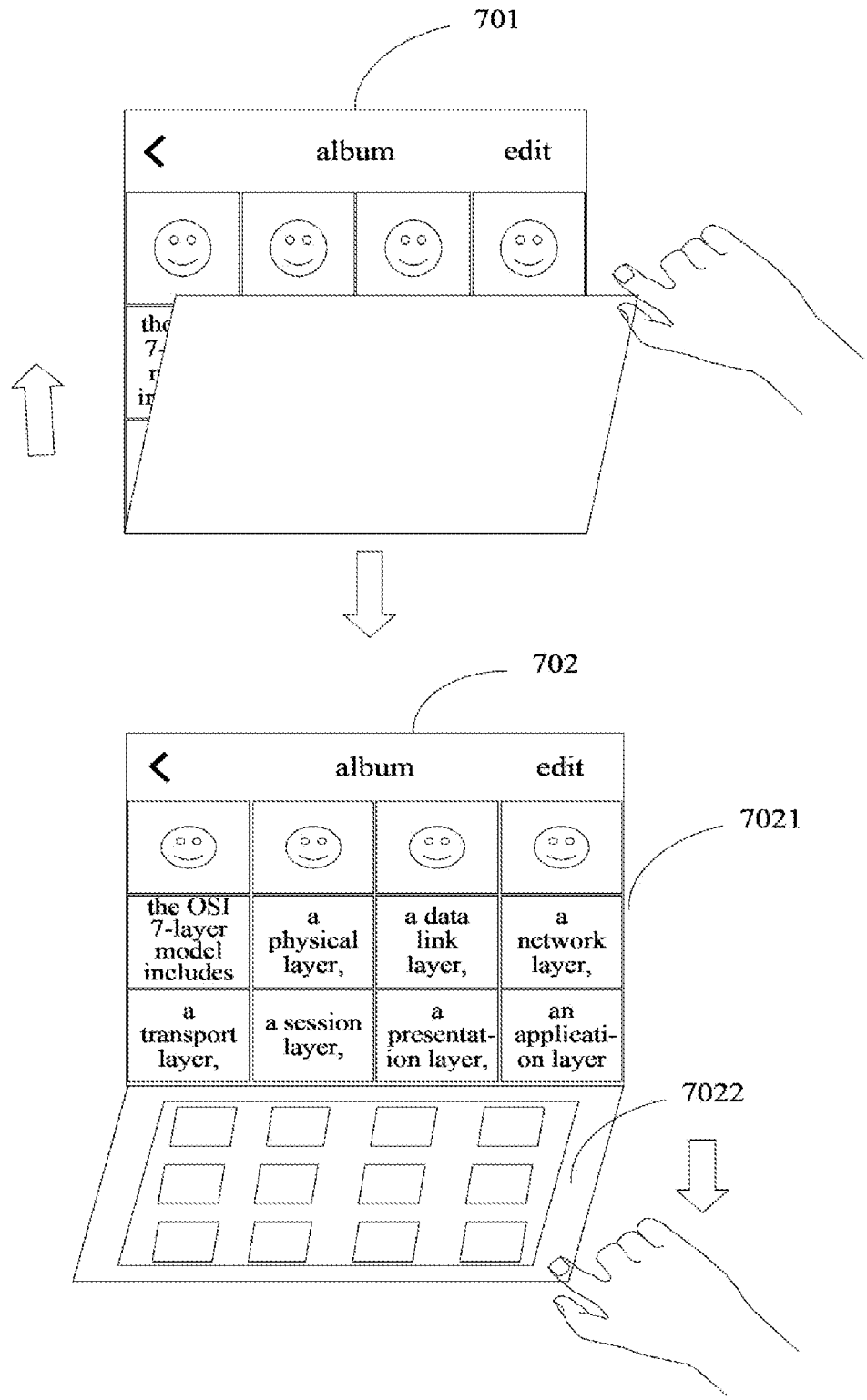
FIG. 7 is a third schematic diagram showing a screen state transition of a flexible-screen terminal according to some embodiments of the present disclosure.

Specifically, a reference may be made to FIG. 7. FIG. 7 is a third schematic diagram showing a screen state transition of a flexible-screen terminal according to some embodiments of the present disclosure, wherein a fifth screen state 701 and a sixth screen state 702 are included. In specific, the fifth screen state 701 is a screen state corresponding to a situation when the flexible-screen terminal user is performing a bending operation on the flexible-screen terminal; the sixth screen state 702 is a state in which the flexible screen is divided into two screen display areas after the bending operation. Specifically, in the sixth screen state 702, the display area of the flexible-screen terminal is divided into a first display area 7021 and a second display area 7022. The first display area 7021 displays a number N of images and the second display area 7022 may display a number N of blank subareas, wherein the blank subareas correspond, in a one-to-one manner, to the number N of images displayed in the first display area in terms of location and size. The flexible-screen terminal may receive a number M of touch operations performed by the user in the number M of target subareas in the second display area 7022, and display a number M of target images among the number N of images displayed in the first display area 7021 that correspond to positions of the number M of target subareas respectively in the operational control zone.

Figure 8:
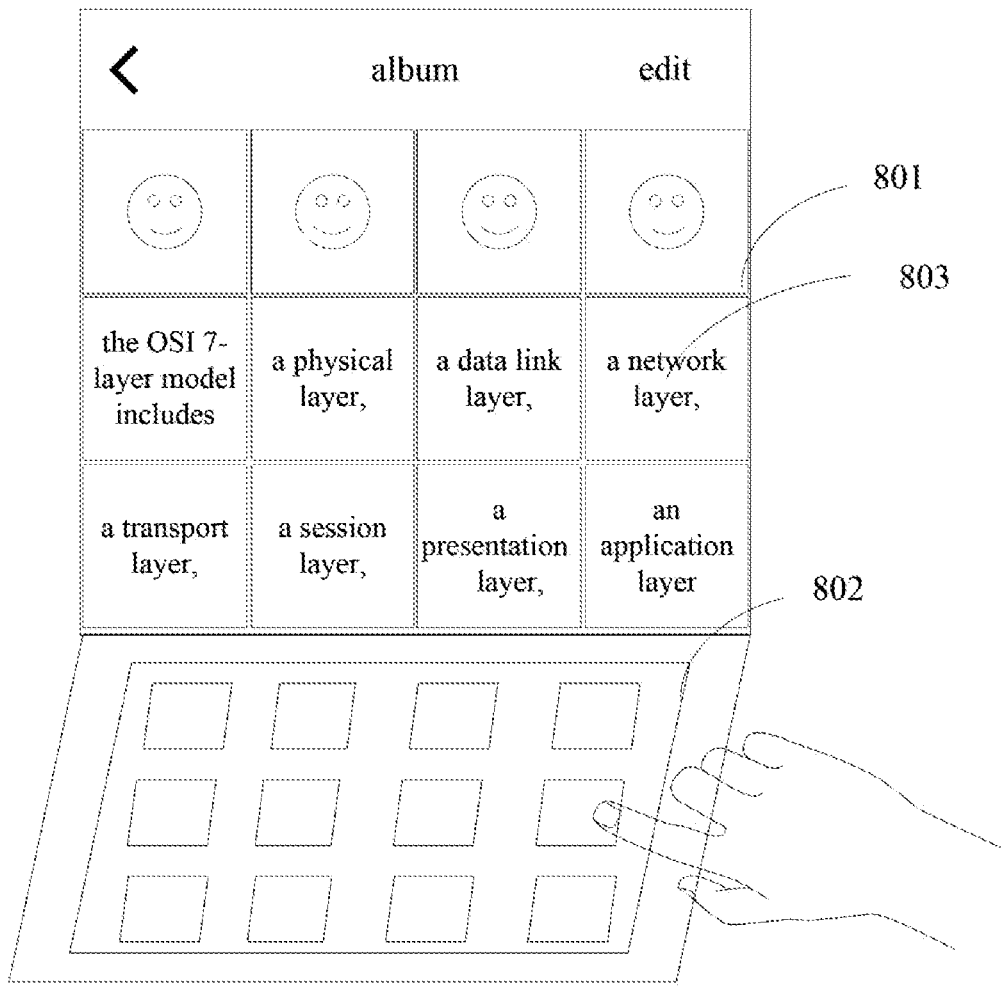
FIG. 8 is a third schematic diagram of a screen of a flexible-screen terminal according to some embodiments of the present disclosure.

For example, referring to FIG. 8, a third schematic diagram of a screen of a flexible-screen terminal according to some embodiments of the present disclosure is illustrated. As shown in FIG. 8, the display area of the flexible-screen terminal includes a first display area 801 and a second display area 802. The first display area 801 displays preview images with three rows and four columns. The second display area 802 displays blank subareas with three rows and four columns corresponding, in a one-to-one manner, to the preview images with three rows and four columns in terms of location and size. As shown in FIG. 8, if a touch operation is detected on a blank box of the second row and the fourth column in the second display area 802, the image of the second row and the fourth column corresponding in terms of location to the blank subarea of the second row and the fourth column is determined as the target image 803. In FIG. 8, the specific text content of the target image 803 includes a network layer.

Optionally, the step 103 as shown in FIG. 1 may further include the following step: receiving a number M of control operations performed by the user on the number M of target images in the first display area; wherein the control operation includes at least one of: a rotation operation of pressing a target image and rotating the first display area of the flexible-screen terminal; an operation of tapping on a target image; or an operation of sliding a target image.

Thus, multiple target images may be selected from the first display area through multiple types of touch operations, making it easy for users to select target images rapidly, thereby improving operation efficiency.

Optionally, the step 104 as shown in FIG. 1 may further include the following step: displaying a trajectory of movement of the target image selected by the second input to the operational control zone.

For example, referring again to FIG. 4, in the case that the second input selects the target image 401, a trajectory of movement of the target image 401 to the operational control zone of the second display area 4022 is displayed.

Thus, a dynamic effect of target image movement may be enhanced, thereby improving user operation experience.

Optionally, after the step 105 as shown in FIG. 1, the method may further include the following steps: receiving a third input by the user, the third input is used for adjusting a screen display mode of the flexible-screen terminal; adjusting a screen mode of the first display area into a screen-off display mode and keeping a screen mode of the second display area at a screen-on display mode in response to the third input.

In some embodiments of the present disclosure, the third input may include a tap operation, a slide operation and the like.

Figure 9:
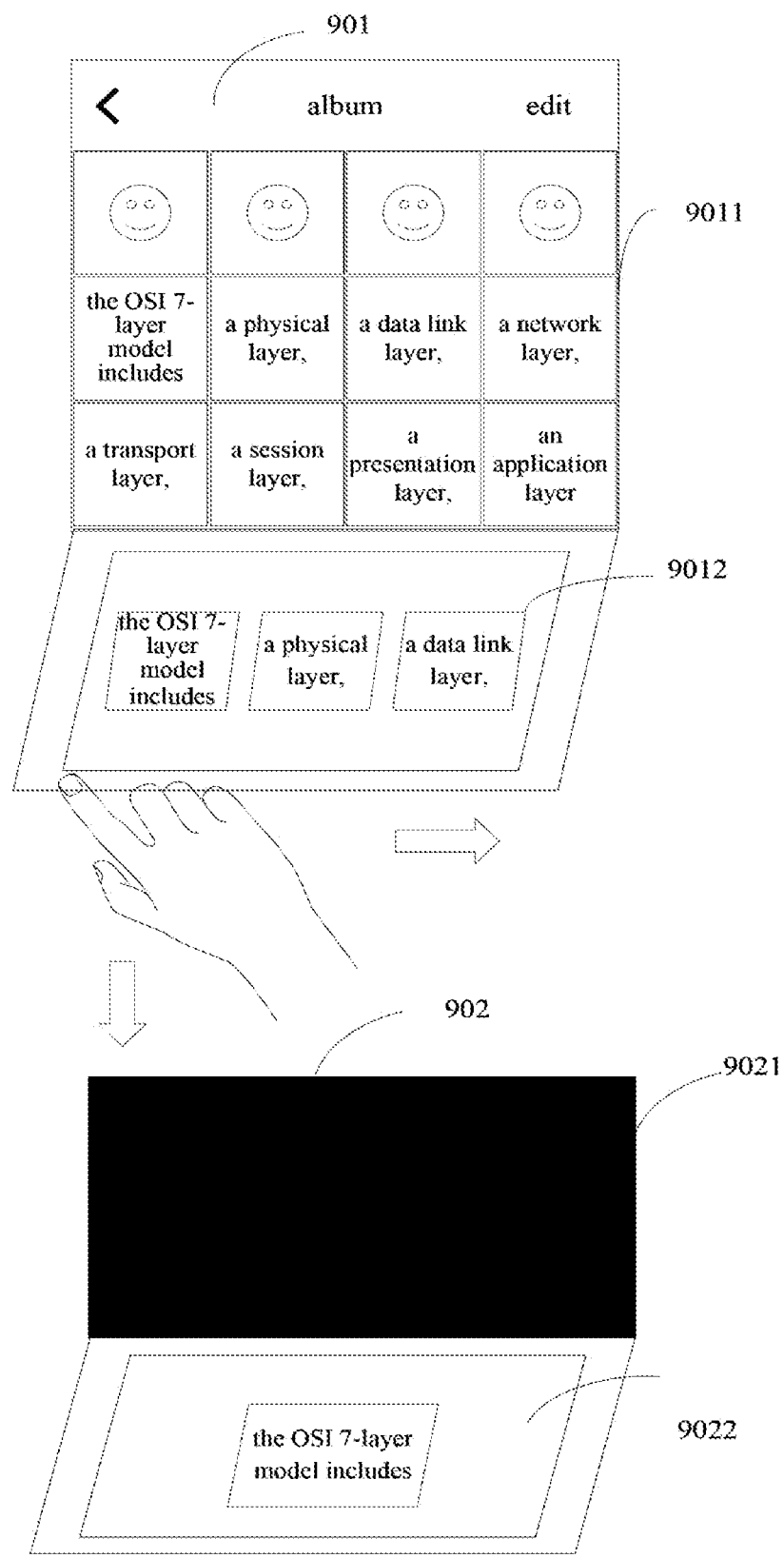
FIG. 9 is a fourth schematic diagram showing a screen state transition of a flexible-screen terminal according to some embodiments of the present disclosure.

Referring to FIG. 9, a fourth schematic diagram showing a screen state transition of a flexible-screen terminal according to some embodiments of the present disclosure is illustrated. Before the third input is detected, the screen of the flexible-screen terminal is in a seventh screen state 901, in which both the first display area 9011 and the second display area 9012 of the screen of the flexible-screen terminal are in a screen-on display mode. After the third input is detected, the screen of the flexible-screen terminal enters an eighth screen state 902, that is, the screen mode of the first display area 9021 is adjusted into a screen-off display mode, and the screen mode of the second display area 9022 remains at the screen-on display mode.

Thus, with the first display area being adjusted to a screen-off display mode, energy consumption may be reduced, thereby enhancing the battery life of the flexible-screen terminal; with the second display area being kept at the screen-on display mode, user may view target images on the second display area for a long time, thereby preventing the user from interruption of viewing on target images due to an abrupt entry into the screen-off display mode of the second display area, and improving user satisfaction during target image viewing.

Optionally, after the step 105 as shown in FIG. 1, the method may further include the following step: receiving a fourth input performed by the user on the second display area, wherein the fourth input is a single-finger slide operation or multi-finger slide operation in a first preset direction; the step 105 as shown in FIG. 1 may further include the following step: displaying text information of the number M of target images in the first display area in response to the fourth input.

For example, referring again to FIG. 5, when the screen is in the third screen state 501, if an operation in which the user pressing and sliding upward, with fingers of both hands, the left and right edges of the second display area 5012 respectively is received, the screen enters the fourth screen state 502, that is, the text information of the three target images 503 displayed in the second display area 5012 is identified and the identified text information is displayed in the first display area 5011. The text information displayed in the first display area 5011 is the OSI 7-layer model includes a physical layer, a data link layer, a network layer, a transport layer, a session layer, a presentation layer and an application layer.

Thus, a mobile terminal may display text information of target images after the fourth input is detected, so that users may flexibly select the time of displaying text information, thereby facilitating the satisfaction of user's requirement on independent choices.

Optionally, after the step 104 as shown in FIG. 1, the method may further include the following steps: receiving a fifth input performed by the user on a first target image displayed in the second display area; cancelling display of the first target image in the second display area in response to the fifth input; wherein the fifth input is a drag operation in a second preset direction performed on the first target image.

Figure 10:
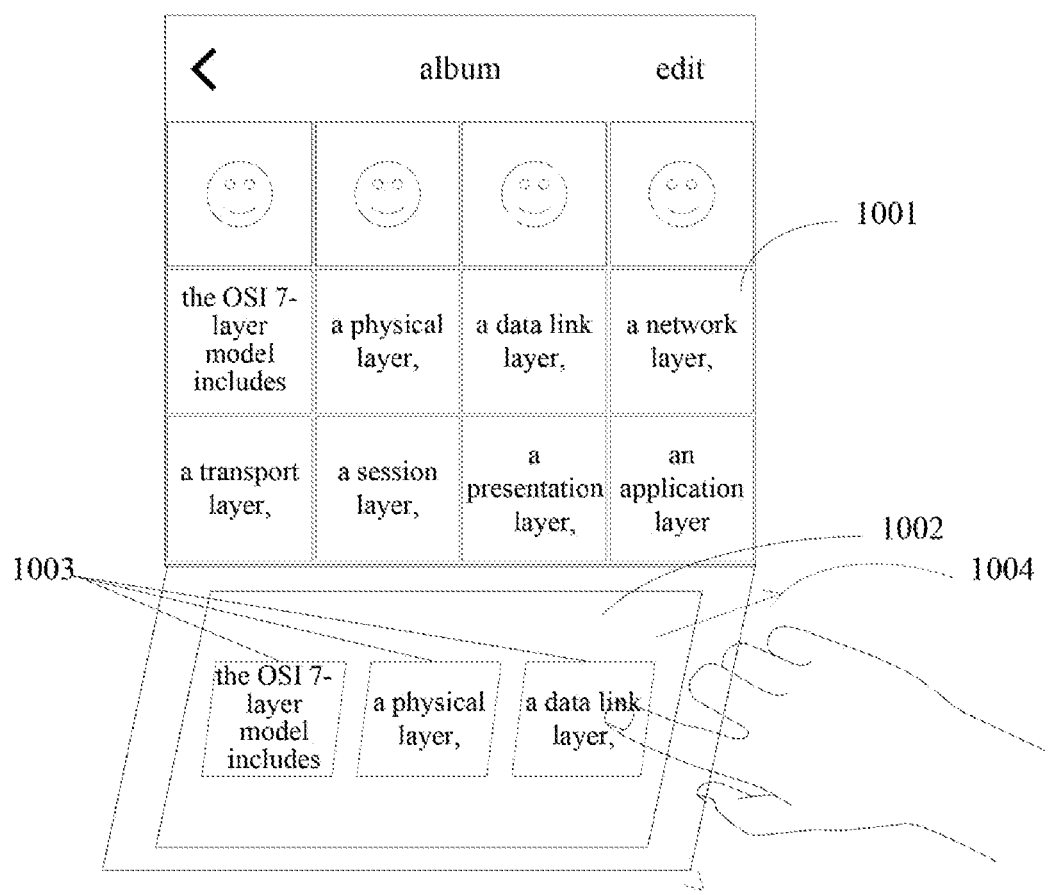
FIG. 10 is a fourth schematic diagram of a screen of a flexible-screen terminal according to some embodiments of the present disclosure.

Referring to FIG. 10, a fourth schematic diagram of a screen of a flexible-screen terminal according to some embodiments of the present disclosure is illustrated. As shown in FIG. 10, the display area of the flexible-screen terminal includes a first display area 1001 and a second display area 1002. Multiple target images 1003 are displayed in the second display area. At least one of the multiple target images 1003 may be deleted in accordance with a preset drag operation 1004 in a second preset direction. For example, the drag operation 1004 in the second preset direction may include an obliquely upward drag operation and an obliquely downward drag operation.

Thus, display of the first target image in the second display area may be cancelled by the drag operation in the second preset direction, thereby improving the speed of cancelling target images in the second display area and facilitating management of target images in the second display area for users.

Optionally, before the step 101 as shown in FIG. 1, the method may further include the following step: displaying a first data in the display area of the flexible-screen terminal in full-screen mode; after the step 105 as shown in FIG. 1, the method may further include the following step: in a case that the flexible-screen terminal resumes an unbent state, controlling the display area of the flexible-screen terminal to display, in full-screen mode, the first data displayed before the first input is received.

Referring again to FIG. 2, before the step 101, first data is displayed on the screen of the flexible-screen terminal 200 in full-screen mode, wherein the first data is a preview image interface of an album application program.

Figure 11:
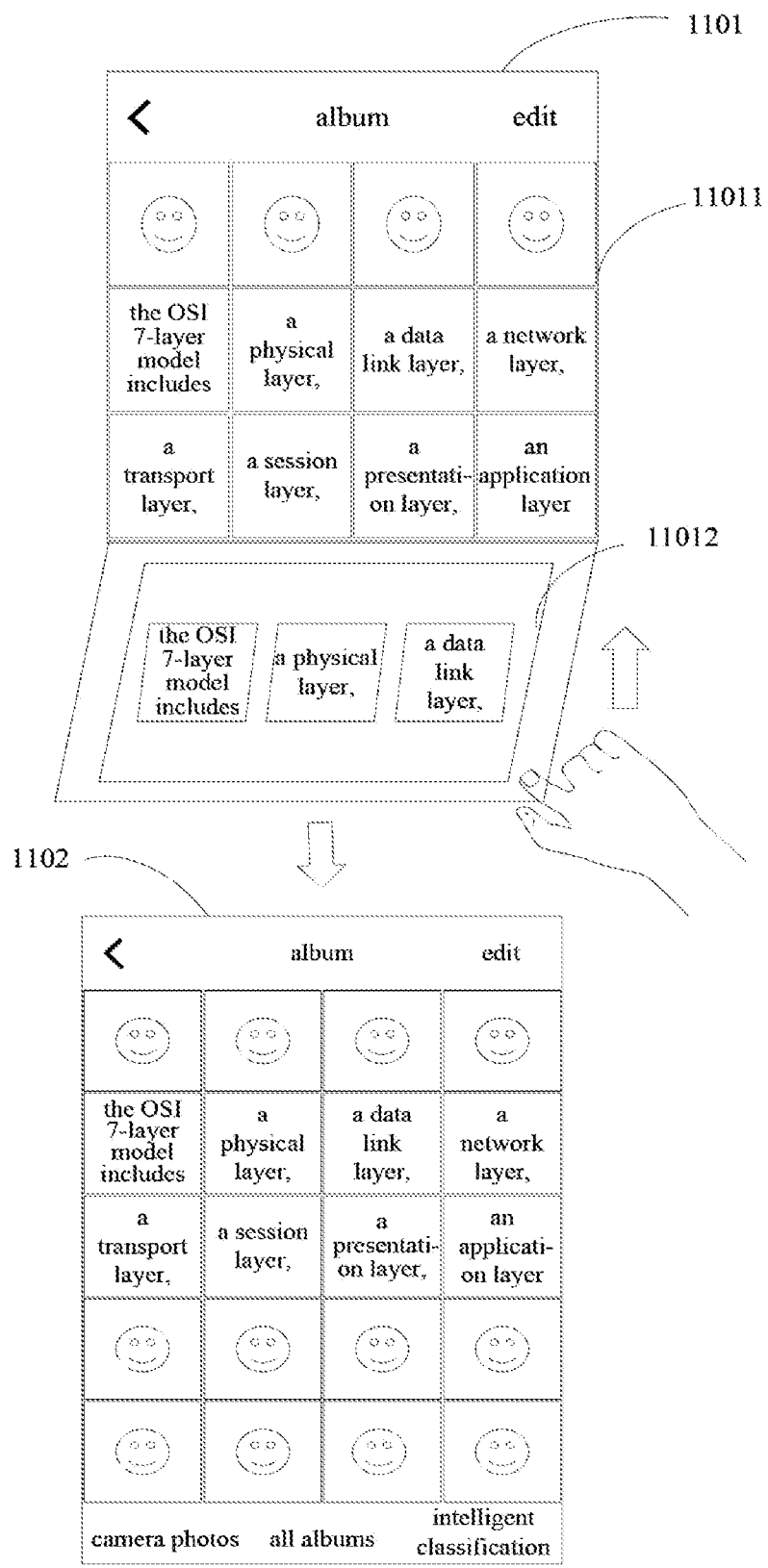
FIG. 11 is a fifth schematic diagram showing a screen state transition of a flexible-screen terminal according to some embodiments of the present disclosure.

Referring to FIG. 11, a fifth schematic diagram showing a screen state transition of a flexible-screen terminal according to some embodiments of the present disclosure is illustrated. Before the flexible screen resumes an unbent state, the screen of the flexible-screen terminal is in a ninth screen state 1101, in which the screen of the flexible-screen terminal includes a first display area 11011 and a second display area 11012. In the case that the flexible screen resumes the unbent state, the screen of the flexible-screen terminal 200 is controlled to display the first data in full-screen mode, that is, the screen of the flexible-screen terminal 200 is controlled to display the preview image interface in full-screen mode.

Thus, a user may restore the flexible screen to a screen state before the first input by restoring the flexible screen to an unbent state, that is, restore the screen to a desired screen state through a simple operational step, thereby improving operation efficiency.

In the image processing method according to some embodiments of the present disclosure, a first input is received from a flexible-screen terminal user, the first input being used for bending the flexible-screen terminal; in response to the first input, a number N of images are displayed in a first display area of the flexible-screen terminal and an operational control zone is displayed in a second display area of the flexible-screen terminal; a second input of bending the flexible-screen terminal is received from the user; a second bend line formed by the second input is acquired; a number M of target images on a preset side of the second bend line are displayed in the operational control zone; and text information of the number M of target images is displayed in the first display area. Thus, contents of selected images may be converted to text information by performing simple operations on the flexible-screen terminal, and operating steps of converting the image contents to text information are simplified, thereby significantly reducing the time spent by users on processing images.

Figure 12:
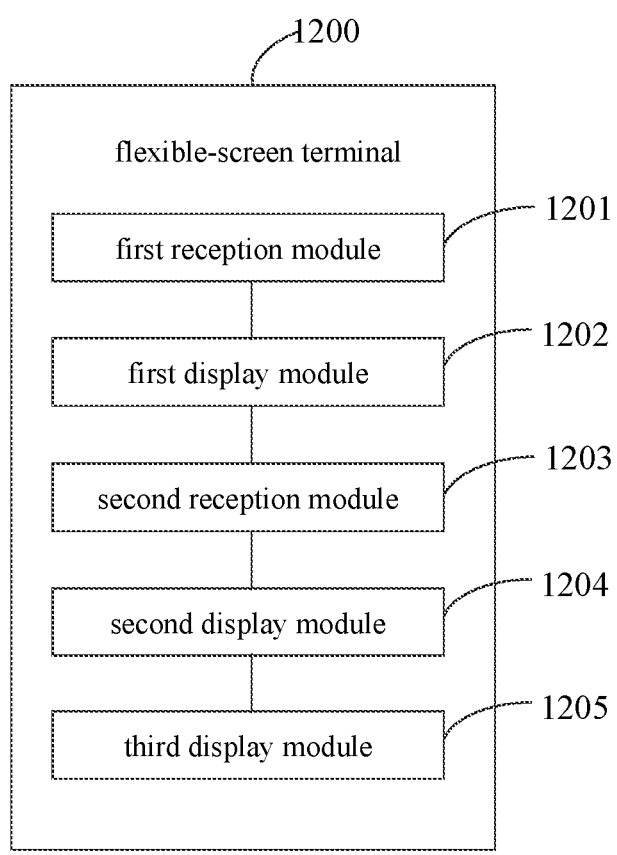
FIG. 12 is a first structural diagram of a flexible-screen terminal according to some embodiments of the present disclosure.

Referring to FIG. 12, a structural diagram of a flexible-screen terminal according to some embodiments of the present disclosure is illustrated. As shown in FIG. 12, a flexible-screen terminal 1200 includes: a first reception module 1201, a first display module 1202, a second reception module 1203, a second display module 1204 and a third display module 1205, wherein the first reception module 1201 is connected to the first display module 1202, the first display module 1202 is further connected to the second reception module 1203, the second reception module 1203 is further connected to the second display module 1204, and the second display module 1204 is further connected to the third display module 1205.

The first reception module 1201 is configured to receive a first input by a flexible-screen terminal user, the first input being used for bending the flexible-screen terminal; the first display module 1202 is configured to display a number N of images in a first display area of the flexible-screen terminal and display an operational control zone in a second display area of the flexible-screen terminal in response to the first input; the second reception module 1203 is configured to receive a second input by the user, the second input being used for selecting a number M of target images from the number N of images; the second display module 1204 is configured to display the number M of target images selected by the second input in the operational control zone in response to the second input; the third display module 1205 is configured to display text information of the number M of target images in the first display area; wherein the first display area and the second display area are two areas generated by dividing a display area of the flexible-screen terminal using a first bend line formed by the first input, both M and N are positive integers and M is less than or equal to N.

Optionally, the second reception module 1203 is further configured to receive the second input, which is bending the flexible-screen terminal by the user; the second display module 1204 includes: an acquisition sub-module, configured to acquire a second bend line formed by the second input; and a display sub-module, configured to display, in the operational control zone, a number M of target images on a preset side of the second bend line.

Optionally, the second display area includes a number N of blank subareas, the subareas corresponding, in a one-to-one manner, to the number N of images displayed in the first display area in terms of location and size; the second reception module 1203 is further configured to receive a number M of touch operations performed by the user in a number M of target subareas in the second display area; the second display module 1204 is further configured to display a number M of target images among the number N of images displayed in the first display area that correspond to positions of the number M of target subareas respectively in the operational control zone.

Optionally, the second reception module 1203 is further configured to receive a number M of control operations performed by the user on the number M of target images in the first display area; wherein the control operation includes at least one of: a rotation operation of pressing a target image and rotating the first display area of the flexible-screen terminal; an operation of tapping on a target image; or an operation of sliding a target image.

Optionally, the second display module 1204 is further configured to display a trajectory of movement of each target image selected by the second input to the operational control zone.

Optionally, the flexible-screen terminal 1200 further includes: a third reception module, configured to receive a third input by the user, the third input being used for adjusting a screen display mode of the flexible-screen terminal; an adjustment module, configured to adjust a screen mode of the first display area into a screen-off display mode and keep a screen mode of the second display area at a screen-on display mode in response to the third input.

Optionally, the flexible-screen terminal 1200 further includes: a fourth reception module, configured to receive a fourth input performed by the user on the second display area, wherein the fourth input is a single-finger slide operation or multi-finger slide operation in a first preset direction; the third display module is further configured to display text information of the number M of target images in the first display area in response to the fourth input.

Optionally, the flexible-screen terminal 1200 further includes: a fifth reception module, configured to receive a fifth input performed by the user on a first target image displayed in the second display area; a cancellation module, configured to cancel display of the first target image in the second display area in response to the fifth input; wherein the fifth input is a drag operation in a second preset direction performed on the first target image.

Optionally, the flexible-screen terminal 1200 further includes: a fourth display module, configured to display a first data in the display area of the flexible-screen terminal in full-screen mode before the first input is received from the flexible-screen terminal user; a resumption module, configured to, after text information of the number M of target images is displayed in the first display area, in a case that the flexible-screen terminal resumes an unbent state, control the display area of the flexible-screen terminal to display, in full-screen mode, the first data displayed before the first input is received.

The flexible-screen terminal 1200 is capable of achieving various processes implemented by a flexible-screen terminal in the method embodiments as shown in FIG. 1 and FIG. 6. To avoid repetition, a detailed description is omitted herein.

With the flexible-screen terminal 1200 according to some embodiments of the present disclosure, contents of selected images may be converted to text information by performing simple operations on the flexible-screen terminal, and operating steps of converting the image contents to text information are simplified, thereby significantly reducing the time spent by users on processing images.

Figure 13:
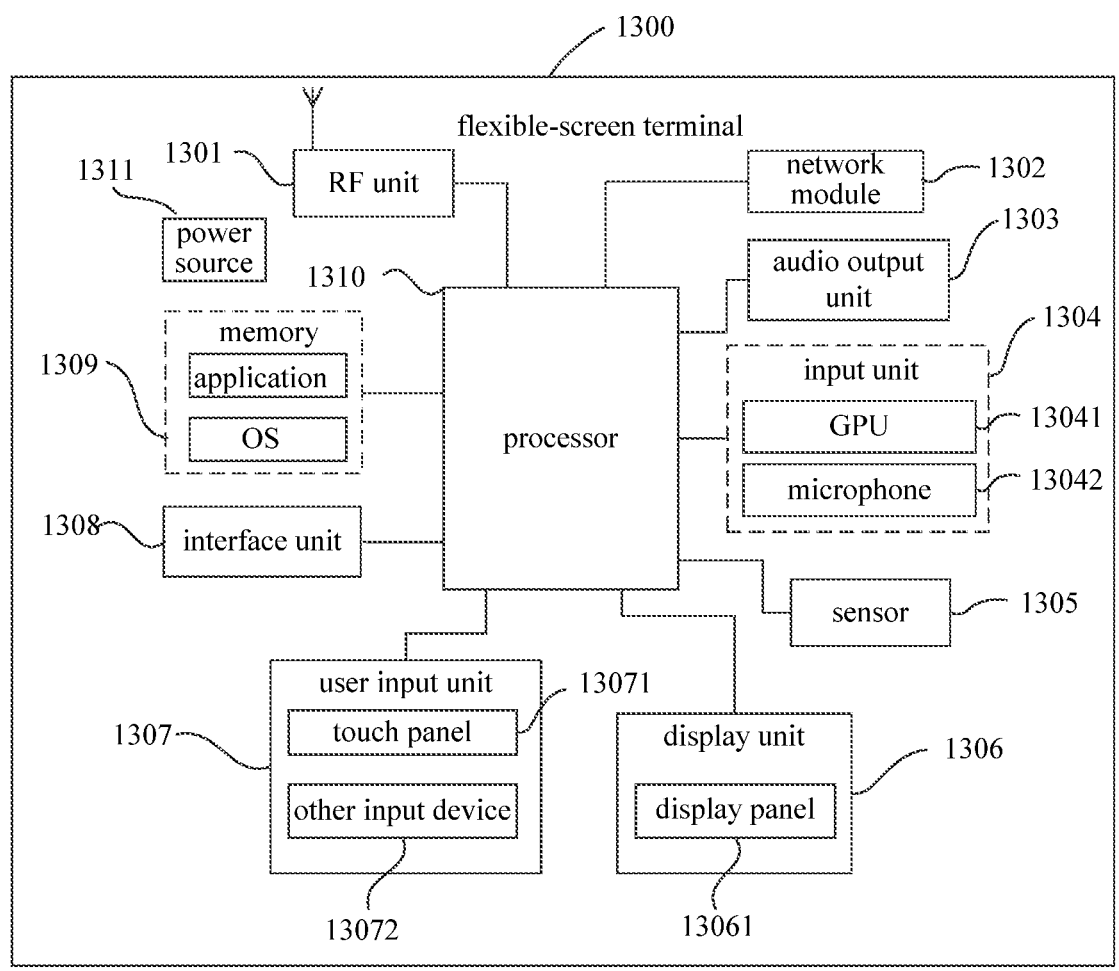
FIG. 13 is a second structural diagram of a flexible-screen terminal according to some embodiments of the present disclosure.

FIG. 13 is a hardware structure diagram of a flexible-screen terminal implementing various embodiments of the present disclosure. The flexible-screen terminal 1300 includes, but is not limited to: a radio frequency (Radio Frequency, RF) unit 1301, a network module 1302, an audio output unit 1303, an input unit 1304, a sensor 1305, a display unit 1306, a user input unit 1307, an interface unit 1308, a memory 1309, a processor 1310, a power source 1311, etc. It should be appreciated by those skilled in the art that, the structure of flexible-screen terminal as shown in FIG. 13 does not constitute a limitation on the flexible-screen terminal. The flexible-screen terminal may include more or fewer components, or some components may be combined, or the flexible-screen terminal may have different component layouts. In some embodiments of the present disclosure, the flexible-screen terminal includes, but is not limited to: a mobile phone, a tablet personal computer, a notebook computer, a palm computer, a vehicle-mounted terminal, a wearable device, a pedometer or the like.

The processor 1310 is configured to perform the following steps: receiving a first input by a flexible-screen terminal user, the first input being used for bending the flexible-screen terminal; displaying a number N of images in a first display area of the flexible-screen terminal and displaying an operational control zone in a second display area of the flexible-screen terminal in response to the first input; receiving a second input by the user, the second input being used for selecting a number M of target images from the number N of images; displaying the number M of target images selected by the second input in the operational control zone in response to the second input; displaying text information of the number M of target images in the first display area; wherein the first display area and the second display area are two areas generated by dividing a display area of the flexible-screen terminal using a first bend line formed by the first input, both M and N are positive integers and M is less than or equal to N.

Optionally, the step, performed by the processor 1310, of receiving the second input by the user includes: receiving the second input, which is bending the flexible-screen terminal by the user; the step, performed by the processor 1310, of displaying the number M of target images selected by the second input in the operational control zone in response to the second input includes: acquiring a second bend line formed by the second input; and displaying, in the operational control zone, a number M of target images on a preset side of the second bend line.

Optionally, the second display area includes a number N of blank subareas, the subareas corresponding, in a one-to-one manner, to the number N of images displayed in the first display area in terms of location and size; the step, performed by the processor 1310, of receiving the second input by the user includes: receiving a number M of touch operations performed by the user in a number M of target subareas in the second display area; the step, performed by the processor 1310, of displaying the number M of target images selected by the second input in the operational control zone in response to the second input includes: displaying a number M of target images among the number N of images displayed in the first display area that correspond to positions of the number M of target subareas respectively in the operational control zone.

Optionally, the step, performed by the processor 1310, of receiving the second input by the user includes: receiving a number M of control operations performed by the user on the number M of target images in the first display area; wherein the control operation includes at least one of: a rotation operation of pressing a target image and rotating the first display area of the flexible-screen terminal; an operation of tapping on a target image; or an operation of sliding a target image.

Optionally, the step, performed by the processor 1310, of displaying the number M of target images selected by the second input in the operational control zone includes: displaying a trajectory of movement of each target image selected by the second input to the operational control zone.

Optionally, the processor 1310 is further configured to perform the following steps: receiving a third input by the user, the third input being used for adjusting a screen display mode of the flexible-screen terminal; adjusting a screen mode of the first display area into a screen-off display mode and keeping a screen mode of the second display area at a screen-on display mode in response to the third input.

Optionally, the processor 1310 is further configured to perform the following step: receiving a fourth input performed by the user on the second display area, the fourth input being a single-finger slide operation or multi-finger slide operation in a first preset direction; the step, performed by the processor 1310, of displaying text information of the number M of target images in the first display area includes: displaying text information of the number M of target images in the first display area in response to the fourth input.

Optionally, the processor 1310 is further configured to perform the following steps: receiving a fifth input performed by the user on a first target image displayed in the second display area; cancelling display of the first target image in the second display area in response to the fifth input; wherein the fifth input is a drag operation in a second preset direction performed on the first target image.

Optionally, the processor 1310 is further configured to perform the following steps: displaying a first data in the display area of the flexible-screen terminal in full-screen mode; in a case that the flexible-screen terminal resumes an unbent state, controlling the display area of the flexible-screen terminal to display, in full-screen mode, the first data displayed before the first input is received.

The flexible-screen terminal 1300 is capable of achieving various processes implemented by a flexible-screen terminal in the foregoing embodiments. To avoid repetition, a detailed description is omitted herein.

With the flexible-screen terminal 1300 according to some embodiments of the present disclosure, contents of selected images may be converted to text information by performing simple operations on the flexible-screen terminal, and operating steps of converting the image contents to text information are simplified, thereby significantly reducing the time spent by users on processing images.

It should be appreciated that, in some embodiments of the present disclosure, the RF unit 1301 may be configured to transmit and receive signals during information transmission or phone call. To be specific, the RF unit 1301 may, upon receiving downlink data from a base station, transmit the downlink data to the processor 1310 for processing. In addition, the RF unit 1301 may transmit uplink data to the base station. Usually, the RF unit 1301 includes, but is not limited to: an antenna, at least one amplifier, a transceiver, a coupler, a low-noise amplifier, a duplexer and the like. In addition, the RF unit 1301 may communicate with a network and other devices via a wireless communication system.

The flexible-screen terminal provides a user with wireless broadband Internet access by means of the network module 1302, such as sending and receiving emails, browsing webpages and accessing streamed media.

The audio output unit 1303 is configured to convert audio data received by the RF unit 1301 or the network module 1302 or audio data stored in the memory 1309 into an audio signal and output the audio signal as a sound. In addition, the audio output unit 1303 is further configured to provide an audio output related to a specific function executed by the flexible-screen terminal 1300 (such as, incoming call ringtone, message received ringtone). The audio output unit 1303 includes a loudspeaker, a buzzer and a telephone receiver.

The input unit 1304 is configured to receive an audio or video signal. The input unit 1304 may include a graphics processing unit (Graphics Processing Unit, GPU) 13041 and a microphone 13042. The GPU 13041 is configured to process image data of a static image or video captured by an image capturing unit (e.g., a camera) in a video capturing mode or an image capturing mode, and a processed image frame may be displayed by the display unit 1306. The image frame processed by the GPU 13041 may be stored in the memory 1309 (or other storage medium) or transmitted via the RF unit 1301 or network module 1302. The microphone 13042 is configured to receive sound, and convert the sound into audio data. In a phone call mode, the processed audio data may be converted into a format suitable for transmission to a mobile communication base station via the RF unit 1301 and outputted.

The flexible-screen terminal 1300 further includes at least one sensor 1305, for example, an optical sensor, a motion sensor, among others. In specific, the optical sensor includes ambient light sensor and proximity sensor. The ambient light sensor may adjust a brightness of a display panel 13061 according to the ambient light conditions. The proximity sensor may deactivate the display panel 13061 and/or a backlight when the flexible-screen terminal 1300 is moved close to ear. As a kind of motion sensor, an acceleration sensor may detect a magnitude of acceleration on each direction (generally, on three axes). While remaining still, the acceleration sensor may detect the magnitude and direction of gravity, which may be used in posture identification of the flexible-screen terminal (e.g., switch between portrait and landscape modes, related games, magnetometer posture calibration), vibration identification related function (e.g., pedometer, knocking) and the like; the sensor 1305 may further include a fingerprint sensor, a pressure sensor, an iris sensor, a molecule sensor, a gyroscope, a barometer, a hygrometer, a thermometer, an infrared sensor and the like, which is not described in detail herein.

The display unit 1306 is configured to display information inputted by the user or provided to the user. The display unit 1306 may include the display panel 13061. The display panel 13061 may be constructed in form of liquid crystal display (Liquid Crystal Display, LCD), organic light-emitting diode (Organic Light-Emitting Diode, OLED) and the like.

The user input unit 1307 may be configured to receive input numerical information or character information, and generate key signal inputs related to the user setting and function control of the flexible-screen terminal. To be specific, the user input unit 1307 includes a touch panel 13071 and other input device 13072. The touch panel 13071, also known as touch screen, may detect the touches thereon or in the vicinity thereof performed by the user (such as touch operations performed on or in the vicinity of the touch panel 13071 by the user using a finger, stylus or any other suitable object or accessory). The touch panel 13071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 1310, as well as receives and executes the commands sent from the processor 1310. Further, the touch panel 13071 may be implemented in a variety of modes, such as resistance, capacitance, infrared and surface acoustic wave. In addition to the touch panel 13071, the user input unit 1307 may include other input device 13072. In specific, the other input device 13072 may include, but is not limited to: physical keyboard, functional keys (such as volume control button, switch button, etc.), track ball, mouse, joystick, which is not described in detail herein.

Further, the touch panel 13071 may overlie the display panel 13061. Having detected a touch operation thereon or in the vicinity thereof, the touch panel 13071 conveys the detected touch signal to the processor 1310 to determine a category of the touch event, and the processor 1310 provides corresponding visual output on the display panel 13061 in accordance with the category of the touch event. Although, in FIG. 13, the touch panel 13071 and the display panel 13061 are provided as two separate parts to implement the input and output functions of the flexible-screen terminal, the touch panel 13071 and the display panel 13061 may be integrated to implement the input and output functions of the flexible-screen terminal in some embodiments, which is not limited herein.

The interface unit 1308 is an interface by which an external device is connected to the flexible-screen terminal 1300. For example, the external device may include a wired or wireless headset port, an external power source (or battery charger) port, a wired or wireless data port, a storage card port, a port configured to be connected to a device having an identification module, an audio input/output (Input/Output, I/O) port, a video I/O port, an earphone port and the like. The interface unit 1308 may be configured to receive input (e.g., data information, power, etc.) from the external device and transfer the received input to one or more components in the flexible-screen terminal 1300, or may be configured to transmit data between the flexible-screen terminal 1300 and the external device.

The memory 1309 may be configured to store software program and other data. The memory 1309 may include generally a program storage area and a data storage area. The program storage area may store an operating system (Operating System, OS), an application required for at least one function (such as an audio playing function and an image playback function) and the like; the data storage area may store data (e.g., audio data, phone book, etc.) created according to usage of a mobile phone, and the like. Moreover, the memory 1309 may include a cache, as well as a non-volatile storage, such as at least one disk storage device, flash memory or other non-volatile solid-state storage devices.

The processor 1310 is a control center of the flexible-screen terminal. The processor 1310 is connected to various parts of the entire flexible-screen terminal through various interfaces and lines, and performs various functions of the flexible-screen terminal and processes data by executing or running software programs and/or modules stored in the memory 1309 and invoking data stored in the memory 1309, so as to achieve an overall monitoring of the flexible-screen terminal. The processor 1310 may include one or more processing units; optionally, the processor 1310 may integrate an application processor and a modem, wherein the application processor is mainly responsible for executing an operating system, a user interface, an application program, etc., while the modem is mainly responsible for handling wireless communication. It is understood, the modem may not be integrated in the processor 1310.

The flexible-screen terminal 1300 may further include a power source 1311 (e.g., a battery) providing power to various components. Optionally, the power source 1311 may be logically connected to the processor 1310 via a power management system, such that functions such as charging management, discharging management and power management may be achieved through the power management system.

In addition, the flexible-screen terminal 1300 may include some functional modules not shown, which are not described in detail herein.

Optionally, the present disclosure further provides, in some embodiments, a flexible-screen terminal, including: a processor 1310, a memory 1309 and a computer program stored in the memory 1309 and configured to be executed by the processor 1310, wherein the processor 1310 is configured to execute the computer program, to implement various processes of embodiments of the foregoing image processing method, and may achieve the same technical effect. To avoid repetition, a detailed description is omitted herein.

The present disclosure further provides, in some embodiments, a computer readable storage medium storing therein a computer program, wherein the computer program is configured to be executed by a processor, to implement various processes of embodiments of the foregoing image processing method, and may achieve the same technical effect. To avoid repetition, a detailed description is omitted herein. The computer readable storage medium may be a read-only memory (Read-Only Memory, ROM), a random access memory (Random Access Memory, RAM), a magnetic disk, an optical disc or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes" or "including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. An image processing method, applied to a flexible-screen terminal, comprising:
   receiving a first input by a flexible-screen terminal user, the first input being used for bending the flexible-screen terminal;
   displaying a number N of images in a first display area of the flexible-screen terminal and displaying an operational control zone in a second display area of the flexible-screen terminal in response to the first input;
   receiving a second input by a user, the second input being used for selecting a number M of target images from the number N of images;
   displaying the number M of target images selected by the second input in the operational control zone in response to the second input; and
   displaying text information of the number M of target images in the first display area,
   wherein the first display area and the second display area are areas generated by dividing a display area of the flexible-screen terminal using a first bend line formed by the first input, both M and N are positive integers and M is less than or equal to N.

2. The image processing method according to claim 1, wherein the receiving the second input by the user comprises:
receiving the second input, which is bending the flexible-screen terminal by the user;
the displaying the number M of target images selected by the second input in the operational control zone in response to the second input comprises:
acquiring a second bend line formed by the second input; and
displaying, in the operational control zone, a number M of target images on a preset side of the second bend line.

3. The image processing method according to claim 1, wherein the second display area comprises a number N of blank subareas, the blank subareas corresponding, in a one-to-one manner, to the number N of images displayed in the first display area in terms of location and size;
the receiving the second input by the user comprises:
receiving a number M of touch operations performed by the user in a number M of target subareas in the second display area;
the displaying the number M of target images selected by the second input in the operational control zone in response to the second input comprises:
displaying a number M of target images among the number N of images displayed in the first display area that correspond to positions of the number M of target subareas respectively in the operational control zone.

4. The image processing method according to claim 1, wherein the receiving the second input by the user comprises:
receiving a number M of control operations performed by the user on the number M of target images in the first display area;
wherein the control operation comprises at least one of:
a rotation operation of pressing a target image and rotating the first display area of the flexible-screen terminal;
an operation of tapping on a target image; or
an operation of sliding a target image.

5. The image processing method according to claim 1, wherein the displaying the number M of target images selected by the second input in the operational control zone comprises:
displaying a trajectory of movement of each target image selected by the second input to the operational control zone.

6. The image processing method according to claim 1, wherein, after the displaying text information of the number M of target images in the first display area, the method further comprises:
receiving a third input by the user, the third input being used for adjusting a screen display mode of the flexible-screen terminal; and
adjusting a screen mode of the first display area into a screen-off display mode and keeping a screen mode of the second display area at a screen-on display mode in response to the third input.

7. The image processing method according to claim 1, wherein, before the displaying text information of the number M of target images in the first display area, the method further comprises:
receiving a fourth input performed by the user on the second display area, the fourth input being a single-finger slide operation or multi-finger slide operation in a first preset direction;
the displaying text information of the number M of target images in the first display area comprises:
displaying text information of the number M of target images in the first display area in response to the fourth input.

8. The image processing method according to claim 1, wherein, after the displaying the number M of target images selected by the second input in the operational control zone, the method further comprises:
receiving a fifth input performed by the user on a first target image displayed in the second display area; and
cancelling display of the first target image in the second display area in response to the fifth input,
wherein the fifth input is a drag operation in a second preset direction performed on the first target image.

9. The image processing method according to claim 1, wherein, before the receiving the first input by the flexible-screen terminal user, the method further comprises:
displaying a first data in the display area of the flexible-screen terminal in full-screen mode;
after the displaying text information of the number M of target images in the first display area, the method further comprises:
in a case that the flexible-screen terminal resumes an unbent state, controlling the display area of the flexible-screen terminal to display, in full-screen mode, the first data displayed before the first input is received.

10. A flexible-screen terminal, comprising a processor, a non-transitory storage medium and a computer program stored in the non-transitory storage medium and capable of running on the processor, the computer program is executed by the processor to implement steps of an image processing method, the image processing method comprising:
receiving a first input by a flexible-screen terminal user, the first input being used for bending the flexible-screen terminal;
displaying a number N of images in a first display area of the flexible-screen terminal and displaying an operational control zone in a second display area of the flexible-screen terminal in response to the first input;
receiving a second input by a user, the second input being used for selecting a number M of target images from the number N of images;
displaying the number M of target images selected by the second input in the operational control zone in response to the second input; and
displaying text information of the number M of target images in the first display area,
wherein the first display area and the second display area are areas generated by dividing a display area of the flexible-screen terminal using a first bend line formed by the first input, both M and N are positive integers and M is less than or equal to N.

11. The flexible-screen terminal according to claim 10, wherein the receiving the second input by the user comprises:
receiving the second input, which is bending the flexible-screen terminal by the user;
the displaying the number M of target images selected by the second input in the operational control zone in response to the second input comprises:
acquiring a second bend line formed by the second input; and
displaying, in the operational control zone, a number M of target images on a preset side of the second bend line.

12. The flexible-screen terminal according to claim 10, wherein the second display area comprises a number N of blank subareas, the blank subareas corresponding, in a one-to-one manner, to the number N of images displayed in the first display area in terms of location and size;

the receiving the second input by the user comprises:
receiving a number M of touch operations performed by the user in a number M of target subareas in the second display area;

the displaying the number M of target images selected by the second input in the operational control zone in response to the second input comprises:

displaying a number M of target images among the number N of images displayed in the first display area that correspond to positions of the number M of target subareas respectively in the operational control zone.

13. The flexible-screen terminal according to claim 10, wherein the receiving the second input by the user comprises:

receiving a number M of control operations performed by the user on the number M of target images in the first display area;

wherein the control operation comprises at least one of:
a rotation operation of pressing a target image and rotating the first display area of the flexible-screen terminal;
an operation of tapping on a target image; or
an operation of sliding a target image.

14. The flexible-screen terminal according to claim 10, wherein the displaying the number M of target images selected by the second input in the operational control zone comprises:

displaying a trajectory of movement of each target image selected by the second input to the operational control zone.

15. The flexible-screen terminal according to claim 10, wherein, after the displaying text information of the number M of target images in the first display area, the method further comprises:

receiving a third input by the user, the third input being used for adjusting a screen display mode of the flexible-screen terminal; and adjusting a screen mode of the first display area into a screen-off display mode and keeping a screen mode of the second display area at a screen-on display mode in response to the third input.

16. The flexible-screen terminal according to claim 10, wherein, before the displaying text information of the number M of target images in the first display area, the method further comprises:

receiving a fourth input performed by the user on the second display area, the fourth input being a single-finger slide operation or multi-finger slide operation in a first preset direction;

the displaying text information of the number M of target images in the first display area comprises:

displaying text information of the number M of target images in the first display area in response to the fourth input.

17. The flexible-screen terminal according to claim 10, wherein, after the displaying the number M of target images selected by the second input in the operational control zone, the method further comprises:

receiving a fifth input performed by the user on a first target image displayed in the second display area; and cancelling display of the first target image in the second display area in response to the fifth input, wherein the fifth input is a drag operation in a second preset direction performed on the first target image.

18. The flexible-screen terminal according to claim 10, wherein, before the receiving the first input by the flexible-screen terminal user, the method further comprises:

displaying a first data in the display area of the flexible-screen terminal in full-screen mode;

after the displaying text information of the number M of target images in the first display area, the method further comprises:

in a case that the flexible-screen terminal resumes an unbent state, controlling the display area of the flexible-screen terminal to display, in full-screen mode, the first data displayed before the first input is received.

19. A non-transitory computer readable storage medium storing a computer program, wherein the computer program is executed by a processor to implement steps of an image processing method, the image processing method comprising:

receiving a first input by a flexible-screen terminal user, the first input being used for bending the flexible-screen terminal;

displaying a number N of images in a first display area of the flexible-screen terminal and displaying an operational control zone in a second display area of the flexible-screen terminal in response to the first input;

receiving a second input by a user, the second input being used for selecting a number M of target images from the number N of images;

displaying the number M of target images selected by the second input in the operational control zone in response to the second input; and displaying text information of the number M of target images in the first display area, wherein the first display area and the second display area are areas generated by dividing a display area of the flexible-screen terminal using a first bend line formed by the first input, both M and N are positive integers and M is less than or equal to N.

20. The non-transitory computer readable storage medium according to claim 19, wherein the receiving the second input by the user comprises:

receiving the second input, which is bending the flexible-screen terminal by the user;

the displaying the number M of target images selected by the second input in the operational control zone in response to the second input comprises:

acquiring a second bend line formed by the second input; and displaying, in the operational control zone, a number M of target images on a preset side of the second bend line.

* * * * *